US005109096A

United States Patent [19]
Hess et al.

[11] Patent Number: 5,109,096
[45] Date of Patent: Apr. 28, 1992

[54] POLYURETHANE-BASED ONE-COMPONENT REACTIVE ADHESIVES

[75] Inventors: Heinrich Hess; Richard Kopp, both of Cologne; Gerhard Grögler; Horst Stepanski, both of Leverkusen; Günter Arend, Dormagen; Hans Tups, Bergisch, all of Fed. Rep. of Germany

[73] Assignee: Bayer Aktiengesellschaft, Leverkusen, Fed. Rep. of Germany

[21] Appl. No.: 535,802

[22] Filed: Jun. 11, 1990

[30] Foreign Application Priority Data

Jun. 16, 1989 [DE] Fed. Rep. of Germany ....... 3919697

[51] Int. Cl.$^5$ ............... C08G 18/32; C08G 18/14
[52] U.S. Cl. ........................... 528/49; 528/44; 528/48; 528/59; 528/60; 528/61; 528/71; 528/73; 528/68; 524/501; 524/542; 524/839
[58] Field of Search ............... 524/789, 501, 542, 839; 521/116; 525/123; 528/49, 77, 81, 83, 59, 60, 61, 73

[56] References Cited

U.S. PATENT DOCUMENTS

| | | | |
|---|---|---|---|
| 4,336,298 | 6/1982 | Schwarz | 428/285 |
| 4,483,974 | 11/1984 | Grögler et al. | 528/68 |
| 4,543,393 | 9/1985 | Blum et al. | 525/124 |
| 4,663,415 | 5/1987 | Grögler et al. | 528/61 |
| 4,667,008 | 5/1987 | Grögler et al. | 528/44 |
| 4,722,969 | 2/1988 | Huynh Tran et al. | 525/123 |
| 4,804,623 | 1/1989 | Hess et al. | 528/49 |
| 4,940,844 | 7/1990 | Blount | 521/116 |
| 5,013,810 | 5/1991 | Sarpeshkar et al. | 528/59 |

OTHER PUBLICATIONS

Chemical Abstracts, vol. 106, No. 18, May 1987, No. 139199 "Adhesive Strength and Water Resistance of Polyurethane Adhesives".

*Primary Examiner*—John Kight, III
*Assistant Examiner*—Duc Truong
*Attorney, Agent, or Firm*—Joseph C. Gil; Godfried R. Akorli

[57] ABSTRACT

The present invention is directed to a reactive polyurethane mixture comprising:
  A) at least one polyisocyanate,
  B) a polyol mixture comprising:
    B1) at least one polyol containing three or more hydroxyl groups and having a molecular weight in the range from 800 to 6,000,
    B2) at least one polyol containing three or more hydroxyl groups and having a molecular weight in the range from 400 to 799 and
    B3) at least one polyol containing three or more hydroxyl groups and having a molecular weight in the range from 92 to 399, and
  C) at least one polyamine.

10 Claims, No Drawings

POLYURETHANE-BASED ONE-COMPONENT REACTIVE ADHESIVES

BACKGROUND OF THE INVENTION

The present invention relates to reactive polyurethane mixtures and to their use as one-component adhesive systems.

Heat-curing one-component reactive adhesives based on solid, finely divided polyisocyanates stabilized by coating with polyadducts and isocyanate-reactive compounds, such as polyols and polyamines, are known in the patent literature (see for example European patents 62,780, 100,508 and 153,579 and German Auslegeschriften 3,112,054, 3,228,723 and 3,403,499).

There is considerable interest in the bonding of motor vehicle body parts of, for example, glass-fiber-reinforced polyester resin (SMC). Adhesives currently used which achieve their final strength by application of heat, are not genuine one-component adhesives, but two-component adhesives with a very long pot life or mixtures which react via more than one stage.

In the bonding of SMC parts, the heat is normally applied to the parts to be bonded by metal heating jaws, which are adapted to the contour of the parts to be made and through which heated thermal oil flows, and is thus transmitted to the layer of adhesive. Heating by the heating jaw process is much quicker than heating in a circulating air oven where air not metal is used as the heat transfer medium. Short cycle times are thus possible. Hitherto standard two-component adhesives, in which the polyisocyanate at least is present as the continuous phase, continue to react slowly on their own, even at room temperature, after the first heat shock and removal of the heat supply until they reach their final strength.

Heat-curing one-component adhesives of the described type based on powder-form solid polyisocyanates require the continuous application of heat from outside to completely react. Accordingly, a hitherto unsolved problem in the bonding of SMC parts by the heating-jaw technique has been to allow the one-component adhesive to set to such an extent in the first hardening phase (for example 2 min. at 120° C.) that good handling characteristics are obtained (hand strength >1N/mm2) and the bond acquires its ultimate strength during the thermal after-treatment phase (paint oven).

The rate at which the adhesive is brought to the setting temperature is obviously crucial to the build up of cohesion (strength through high molecular build up) and adhesion (physical and chemical interactions of the adhesive boundary layer with the substrate surface).

In circulating air ovens, the heat is supplied relatively slowly. Accordingly, the temperature in the adhesive film rises relatively slowly and the reactants have sufficient time to react by diffusion and chemical reaction to form a high molecular weight substance with, at the same time, good adhesion to the substrate surface, i.e. to form a genuine adhesive.

In the heating-jaw process, heating is so rapid that, although the adhesive hardens, it is unable to develop any adhesion to the substrate surface. In cases such as these, even subsequent heat treatment is unable to produce the adhesion required for an adhesive.

Accordingly, the problem addressed by the present invention was to provide improved adhesives, particularly for rapid heating systems.

DESCRIPTION OF THE INVENTION

The present invention relates to reactive polyurethane mixtures comprising:
A) at least one polyisocyanate,
B) a polyol mixture comprising:
B1) at least one polyol containing three or more hydroxyl groups and having a molecular weight in the range from 800 to 6,000,
B2) at least one polyol containing three or more hydroxyl groups and having a molecular weight in the range from 400 to 799 and
B3) at least one polyol containing three or more hydroxyl groups and having a molecular weight in the range from 92 to 399, and
C) at least one polyamine.

The molecular weight is defined as the number average of all the molecular weights occurring in the particular polyol. The number average Mn (in contrast to the weight average) of the molecular weight is defined as $$Mn = \frac{\Sigma_i n_i \cdot M_i}{\Sigma n_i}$$

which is the number n of the molecules i with the molecular weight M divided by the total number of all the molecules.

Component B1) is preferably used in a quantity of 0.03 to 3 mol and more preferably in a quantity of 0.1 to 1.0 mol per mol of component B2) while component B3 is preferably used in a quantity of from 0.03 to 5 mol and more preferably in a quantity of from 0.1 to 2 mol per mol of component B2).

Preferred polyisocyanates A) have a melting point above 40° C. and preferably above 80° C. Examples include 1,5-naphthalene diisocyanate, dimeric 4,4'-diisocyanatodiphenyl methane, dimeric 2,4-diisocyanatotoluene, 3,3'-diisocyanato-4,4,'-dimethyl-N,N'-diphenyl urea and N,N'-bis-[4-(4- or 2-isocyanatophenylmethyl)-phenyl]-urea. Dimeric 2,4-diisocyanatotoluene is particularly preferred.

The polyisocyanates are preferably stabilized by the action of, for example, aliphatic polyamines having molecular weights in the range from 32 to 399 and, optionally, by the action of aliphatic polyamines having molecular weights in the range from 400 to 8,000. Examples of such polyamines are ethylene diamine, 1-amino-3,3,5-trimethyl-5-aminomethylcyclohexane, 3,3'-dimethyl-4,4'-diaminodicyclo-hexyl methane, diethylenetriamine, methyl nonanediamine.

Other suitable stabilizers are, for example, hydrazine, generally in the form of hydrazine hydrate, $C_{1-6}$-alkyl-substituted hydrazines, for example methyl hydrazine, ethyl hydrazine, hydroxyethyl hydrazine or N,N'-dimethyl hydrazine, hydrazide-terminated compounds such as, for example, carbodihydrazide, ethylene-bis-carbazinic ester, β-semicarbazidopropionic acid hydrazide or isophorone-bis-semicarbazide. Other deactivators are listed in German Auslegeschriften 3,230,757 and 3,112,054 and in European patents 103,325 and 62,780.

Open-chain monocyclic or bicyclic amidines and guanidines, which do not contain any isocyanate-reactive hydrogen atoms, may also be used as stabilizers for the isocyanate component. Examples of compounds such as these are tetramethyl guanidine, pentamethyl guanidine, 1,2-dimethyl tetrahydropyrimidine, 1,8-diazabicyclo-[5.4.0]-undec-7-ene, 1,5-diazabicyclo[4.3.0]-non-5-ene. Further examples of amidines such as these are listed in German Auslegeschrift 3,403,500.

Suitable NCO-reactive suspension mediums for the solid, stabilized polyisocyanates are, for example, liquid or low-melting (<80° C., preferably <60° C.) low molecular weight and/or relatively high molecular weight polyols and/or polyamines.

Preferred polyols B1) to B3) are polyesters, polythioethers, polyacetals, polycarbonates, polyester amides and, in particular, glycols and polyethers. Examples of such polyols are described in detail, for example, in German Auslegeschriften 2,920,501, 2,854,384 and 3,230,757.

Polyhydroxyl compounds containing high molecular weight polyadducts or polycondensates or polymers in finely disperse or even dissolved form (filled polyols) may also be used. Polyadduct-containing polyhydroxyl compounds are obtained by carrying out polyaddition reactions (for example reactions between polyisocyanates and amino-functional compounds) or polycondensation reactions (for example between formaldehyde and phenols and/or amines) in situ in the above-mentioned compounds containing hydroxyl groups.

Polyhydroxyl compounds modified by vinyl polymers, of the type obtained, for example, by polymerization of styrene and acrylonitrile in the presence of polyethers or polycarbonate polyols, are also suitable for the process according to the invention.

Representatives of these compounds which may be used in accordance with the invention are described, for example, in High Polymers, Vol. XVI, "Polyurethanes, Chemistry and Technology", edited by Saunders-Frisch, Interscience Publishers, New York, London, Vol. I, 1962, pages 32-42 and pages 44 and 54 and Vol. II, 1964, pages 5-6 and 198-199 and in Kunststoff-Handbuch, Vol. VII, Vieweg-Hochtlen, Carl-Hanser-Verlag, Munchen, 1966, for example on pages 45-71, and in German Offenlegungsschriften 2,854,384 and 2,920,501.

Other suitable polyols are polymers containing hydroxyl groups, for example copolymers of olefinically unsaturated monomers and olefinically unsaturated monomers containing active hydrogen. They are described, for example, in European patent 62,780. They are preferably used for sealing compounds, fillers, adhesives or undersealing compounds.

Mixtures of the above-mentioned compounds containing at least three hydroxy groups, for example mixtures of polyethers and polyesters, within each of the three molecular weight ranges mentioned may of course be used.

Other suitable polyols B3) present are low molecular weight chain-extending agents or crosslinking agents. These chain-extending agents or crosslinking agents are, in particular, at least trifunctional compounds containing hydroxyl groups attached to aliphatic and/or cycloaliphatic groups and having molecular weights in the range from 92 to 399. These compounds generally contain from 3 to 8, preferably from 3 to 4 and more preferably 3 hydroxyl groups. Mixtures of different compounds may also be used, more particularly trimethylol propane, trimethylol ethane, hexane-1,2,6-triol, glycerol, pentaerythritol, quinitol, mannitol, sorbitol, castor oil and also formose or formitol.

Tert.-amine-containing polyols, for example triethanolamine, are also suitable.

Polyhydroxyl compounds already containing urethane or urea groups and optionally modified natural polyols, such as castor oil, carbohydrates or starch, may also be used. Adducts of alkylene oxides with phenol-formaldehyde resins and with urea-formaldehyde resins are also suitable for use in the process according to the invention. In one particularly preferred embodiment, the polyol mixture B1) to B3) consists at least partly of prepolymers containing hydroxyl groups obtainable, more particularly obtained, by reaction with at least one isocyanate. However, non-pre-extended mixtures may also be used. To prepare the prepolymers containing hydroxyl groups, the low molecular weight and relatively high molecular weight polyols mentioned above may optionally be modified by preliminary reaction with a substoichiometric quantity of polyisocyanate. Polyisocyanates suitable for this purpose are aliphatic, cycloaliphatic, araliphatic, aromatic and/or heterocyclic polyisocyanates of the type described, for example, in German Offenlegungsschrift 2,920,501. Particularly preferred polyisocyanates are, in general, the commercially readily obtainable polyisocyanates, for example 2,4- and 2,6-tolylene diisocyanate and mixtures of these isomers ("TDI") polyphenyl-polymethylene polyisocyanates of the type obtained by phosgenation of aniline-formaldehyde condensates ("crude MDI"), 4,4'- and/or 2,4'-diphenylmethane diisocyanate, 1,6-hexamethylene diisocyanate, 1-isocyanato-3,3,5-trimethyl 5-isocyanatomethyl cyclohexane (IPDI), perhydro-2,4'- and/or -4,4" diphonylmethane diisocyanate.

Liquid, low and/or relatively high molecular weight, aromatic and/or aliphatic polyamines, more particularly those having a molecular weight in the range from 700 to 4500, may be used as the polyamine C). Relatively high molecular weight aliphatic polyamines, optionally containing small quantities of low molecular weight aliphatic polyamines, are preferred.

One preferred embodiment is characterized by the use of relatively high molecular weight polyamino compounds containing aliphatic amino groups and having an equivalent weight in the range from 250 to 2000 and preferably in the range from 300 to 750 of the type obtained, for example, by the reductive amination of polyoxyalkylene glycols with ammonia in accordance with Belgian patent 634,741 or U.S. Pat. No. 3,654,370. Other polyoxyalkylene polyamines of relatively high molecular weight may be obtained by methods of the type described in the booklet entitled "Jeffamine, Polyoxypropylene Amines" published by the Texaco Chemical Co., 1978, for example by the hydrogenation of cyanoethylated polyoxypropylene glycols (German Auslegeschrift 1,193,671), by the amination of polypropylene glycol sulfonic acid esters (U.S. Pat. No. 3,236,895), by treating a polyoxyalkylene glycol with epichlorohydrin and a primary amine (French patent 1,466,708) or by reacting NCO-prepolymers with enamines, aldimines or ketimines containing hydroxyl groups, followed by hydrolysis in accordance with German Auslegeschrift 2,546,536. Other suitable aliphatic di- and polyamines of relatively high molecular weight are the polyamines obtainable by the alkaline base hydrolysis of NCO-prepolymers (with aliphatic diisocyanates) via the carbamate stage in accordance with German Auslegeschriften 2,948,419, 3,039,600, and 3,112,118, and European patents 61,627, 71,132 and 71,139.

The process according to German Auslegeschrift 2,948,419 and the other literature references cited is preferably based on polyether polyamines, but also polyester, polyacetal, polythioether or polycaprolactone polyamines, preferably 2- or 3-functional polyamines which contain urethane groups (from the reaction of the corresponding relatively high molecular weight polyhydroxyl compounds with the excess polyisocyanates) and s which bear the amino groups on the residue of the (former) polyisocyanate. However, the relatively high molecular weight polyamines may also be prepared by other methods, for example by reaction of NCO prepolymers with excess quantities of diamines in accordance with German Auslegeschrift 1,694,152. Another possible synthesis is described in French patent 1,415,317 and comprises converting the NCO prepolymers into the N-formyl derivatives by reaction with formic acid, followed by saponification.

These relatively high molecular weight aliphatic polyamines may be used both as stabilizers for the polyisocyanate component and as a component serving both as suspension medium and as reactive component C).

Particularly preferred polyamines C) are polyethers containing polyalkylene oxide units added onto aromatic starter molecules.

In addition, it is possible to use low molecular weight chain-extending agents D), more especially low molecular weight aromatic diamines having a molecular weight in the range from 108 to 399, in which the amino groups are also attached to heterocyclic radicals of aromatic character.

Standard polyurethane catalysts may optionally be used; tertiary amines or metal catalysts may be used to particularly good effect. Examples of such catalysts are, for example, tertiary amines, such as triethyl amine, tributyl amine, N,N,N',N'-tetramethyl ethylene diamine, 1,4-diazabicyclo (2,2,2)-octane, N,N-dimethyl benzylamine, N,N-dimethyl cyclohexyl amine.

Organometallic compounds suitable as catalysts are, in particular, organic tin compounds and lead compounds. Preferred organotin compounds are tin(II) salts of carboxylic acids, such as tin(II) ethyl hexoate and tin(II) stearate, and the dialkyl tin salts of carboxylic acids, such as for example dibutyl tin dilaurate or dioctyl tin diacetate. Preferred organolead compounds are lead (II) salts of carboxylic acids, such as lead(II) naphthenate, lead(II) ethyl hexoate, lead(II) stearate and also, for example, lead(II)-bis-diethyl dithiocarbamate.

Other representatives of catalysts suitable for use in accordance with the invention and information on the mode of action of the catalysts can be found in Kunststoff-Handbuch, Vol. VII, edited by Vieweg and Hochtlen, Carl-Hanser-Verlag, Munchen 1966, for example on pages 96-102, and in German Auslegeschrift 3,230,757.

The catalysts are generally used in a quantity of from about 0.001 to 10% by weight, based on the composition as a whole.

Suitable auxiliaries and additives which may optionally be present are dyes or pigments, fillers, such as heavy spar, chalk, quartz powder, kieselguhr, silica gel, precipitated silicas, fumed silicas, gypsum, talcum, active carbon, carbon black, metal powders. It is also possible to use reaction retarders, for example compounds showing an acidic reaction, such as hydrochloric acid, organic acid halides or organic acids; flameproofing agents known per se for example trischloroethyl phosphate or ammonium phosphate and polyphosphate; stabilizers against the effects of ageing and weathering, such as phenolic antioxidants and light stabilizers; plasticizers and fungistatic and/or bacteriostatic agents. Examples and particulars of the use of such additives and their mode of action can be found in Kunststoff-Handbuch, Vol. VI, edited by Vieweg and Hochtlen, Carl-Hanser-Verlag, Munchen 1966, for example pages 103-113 and in German Auslegeschriften 2,854,384 and 2,920,501.

Reactive polyurethane adhesive mixtures more or less viscous at room temperature are obtained, depending on the viscosity of the starting components and the type and quantity of fillers used. These reactive adhesive mixtures are suspensions of a solid polyisocyanate stabilized by coating with polyadducts in the polyol and polyamine component. These mixtures are hardened by the effect of heat, for example by heating jaws through which thermal oil flows. The processing of the systems according to the invention is determined by their character and by the particular practical problem to be solved. They may be applied, for example, by hand or by a suitable extruding or spreading tool, for example in the form of a cartridge or a coating knife, to the materials to be bonded, for example articles of bare or pretreated metal, glass, glazed ceramics or plastics, which may even be reinforced, for example, by glass fibers.

In the following Examples, quantities are in parts by weight, unless otherwise indicated.

EXAMPLES

Example 1

Production of the OH prepolymer:

0.1 Part Pb octoate is added and 5 parts isophorone diisocyanate (molecular weight 222) are added dropwise with stirring and with heating (80° C.) to a mixture of 60.5 parts of a polyoxypropylene-oxyethylene ether triol (containing 17.5 % ethylene oxide in the form of a terminal block and having an OH value of 34 and a molecular weight of 4950), 35 parts polyoxypropylene ether triol having an OH value of 370 and a molecular weight of 450 and 4.5 parts trimethylol propane (OH value 1254, molecular weight 134). After stirring for 1 hour at 100° C., ultimately in vacuo an OH prepolymer mixture having a viscosity of 8,000 mPa.s at room temperature (25° C.) is obtained.

40 Parts of a polyoxypropylene ether diamine having an NH value of 112 and a molecular weight of 1,000, obtained from a 2,2-bis-(4-hydroxyphenyl)-propane-initiated polyoxypropylene ether diol by pressure amination with $NH_3$, and another 0.2 part Pb octoate, 0.2 part of a 33% solution of triethylene diamine ("DABCO") in dipropylene glycol, 9 parts Aerosil R202 (hydrophobicized fumed silica made by DEGUSSA) and 0.10 part 4,4'-diamino-3,3'-dimethyl dicylohexyl methane are added to 63.36 parts of the OH prepolymer and, finally, 54.21 parts dimeric 2,4-diisocyanatotoluene are suspended therein. A thixotropic suspension storable at up to 50° C. with a viscosity of approximately 70,000 mPa.s at room temperature is obtained. Thickening temperature: 84° C. Hardness after hardening at 120° C.: 60 Shore D.

Testing of the adhesive properties

Substrates of a 30% glass-fiber-reinforced polyester resin measuring 20 mm×40 mm×4 mm (SMC) are used as the test material.

In addition to the glass-fiber-reinforced polyester, Makrolon (polyhexanediol carbonate) and Duranglas were used as further test materials. After application of the adhesive, two substrate strips were fitted together in such a way that an overlapped area of 10×20 mm and an adhesive film thickness of approximately 0.2 mm are formed. The test specimens are joined firmly to one another (bonded) by application of heat under the conditions shown below. After storage of the test specimens for 1 hour at room temperature, shear strength is determined in accordance with DIN 53 283 at a spindle advance of 100 mm per minute.

The results are shown in the following Table.

| Substrates | Tensile shear strength in N/mm$^2$ | Hardening conditions | Test temperature |
|---|---|---|---|
| SMC/SMC | 1.6 | 2 Min. at 120° C. heating jaws | Room temperature |
| SMC/SMC | 8.3 | 2 Min. at 120° C. heating jaws + 30 min. at 140° C. | Room temperature |
| Makrolon/Makrolon | 4.8 | 5 Min. at 120° C. in a circulating air oven, fixing by paper clips | Room temperature |
| Makrolon/Makrolon | 10.2 | 15 Min. at 120° C., in a circulating air oven, fixing by paper clips | Room temperature |
| Makrolon/Makrolon | 5.7 | 15 Min. at 120° C., in a circulating air oven, fixing by paper clips | 85° C. |
| Duran glass-Makrolon | 4.4 | 15 Min. at 120° C., in a circulating air oven, fixing by paper clips | Room temperature |

Example 2

(Comparative Example)

A heat-curing one-pack adhesive mixture was prepared in accordance with Example 1 of European patent 153,579 and was tested for its suitability for the bonding of SMC parts by the heating jaw process. Testing was carried out in exactly the same way as in Example 1 of the present application.

The test results of Comparison Example 2 are directly compared in the following with the corresponding results of Example I of the present application:

| | Tensile shear strength [N/mm$^2$] at room temperature | Hardening conditions |
|---|---|---|
| Example 1 of the present application | 8.3; Material failure | 2 Min. at 120° C., heating jaws + 30 min. at 140° C., oven |
| Example 2 of the present application = Example 1 of 153.579 | 5.3; Cohesion failure | 5 Min. at 120° C., heating jaws (still not set after 2 min.) + 30 min at 140° C., heating jaws |

The adhesive mixture of Example 2 containing only one triol (MW 450) hardens distinctly more slowly than the mixture of Example 1 according to the invention and does not develop satisfactory tensile shear strength, even after a relatively long residence time in the heating jaws.

Although the invention has been described in detail in the foregoing for the purpose of illustration, it is to be understood that such detail is solely for that purpose and that variations can be made therein by those skilled in the art without departing from the spirit and scope of the invention o except as it may be limited by the claims.

What is claimed is:

1. A reactive mixture comprising:
    A) at least one polyisocyanate,
    B) a polyol mixture comprising:
        B1) at least one polyol containing three or more hydroxyl groups and having a molecular weight in the range from 800 to 6,000,
        B2) at least one polyol containing three or more hydroxyl groups and having a molecular weight in the range from 400 to 799 and
        B3) at least one polyol containing three or more hydroxyl groups and having a molecular weight in the range from 92 to 399, and
    C) at least one polyamine.

2. The reactive mixture of claim 1, wherein the polyol mixture consists at least partly of hydroxyl containing prepolymers obtainable by reaction with an isocyanate.

3. The reactive mixture of claim 1, wherein o the polyamine C) is aliphatic and has the molecular weight in the range from 700 to 4,500.

4. The reactive mixture of claim 1 wherein the polyisocyanate A) is deactivated.

5. The reactive mixture of claim 1 wherein the polyisocyanate is 1,5-naphthalene diisocyanate, dimeric 4,41-diisocyanatodiphenyl methane, dimeric 2,4-diisocyanatotoluene, 3,3'-diisocyanato-4,4'-dimethyl-N,N1-diphenyl urea or N,N'-bis-[4-(4- or 2-isocyanatophenylmethyl)-phenyl]-urea.

6. The reactive mixture of claim 1 wherein the polyol B3) is trimethylol propane.

7. The reactive mixture of claim 1 wherein the polyol B2) has a molecular weight in the range from 400 to and the polyol B1) has a molecular weight in the range from 2,000 to 6,000.

8. The reactive mixture of claim 1 wherein the polyols B1) to B3) are triols.

9. The reactive mixture of claim 1 further containing fumed silica.

10. In a process for bonding two surfaces by applying an adhesive to at least one of the surfaces, brining the surfaces together, and allowing the adhesive to react, the improvement wherein the adhesive is the reactive mixture of claim 1.

* * * * *